(12) United States Patent
Smith

(10) Patent No.: US 10,405,695 B2
(45) Date of Patent: Sep. 10, 2019

(54) THERMODYNAMIC ELEMENT FOR REDUCING COOLING RATE OF A LIQUID

(71) Applicant: Josiah D. Smith, Columbia, MO (US)

(72) Inventor: Josiah D. Smith, Columbia, MO (US)

( * ) Notice: Subject to any disclaimer, the term of this patent is extended or adjusted under 35 U.S.C. 154(b) by 400 days.

(21) Appl. No.: 15/206,580

(22) Filed: Jul. 11, 2016

(65) Prior Publication Data

US 2018/0008091 A1  Jan. 11, 2018

(51) Int. Cl.

| | | |
|---|---|---|
| *A47J 36/24* | (2006.01) | |
| *C04B 33/00* | (2006.01) | |
| *F28D 20/00* | (2006.01) | |
| *F28F 21/04* | (2006.01) | |
| *C04B 33/04* | (2006.01) | |
| *C04B 33/34* | (2006.01) | |
| *C04B 35/565* | (2006.01) | |
| *C04B 41/86* | (2006.01) | |
| *C04B 41/00* | (2006.01) | |
| *C04B 41/50* | (2006.01) | |

(52) U.S. Cl.
CPC .......... *A47J 36/2494* (2013.01); *C04B 33/00* (2013.01); *C04B 33/04* (2013.01); *C04B 33/34* (2013.01); *C04B 35/565* (2013.01); *C04B 41/009* (2013.01); *C04B 41/5022* (2013.01); *C04B 41/86* (2013.01)

(58) Field of Classification Search
None
See application file for complete search history.

(56) References Cited

U.S. PATENT DOCUMENTS 5,189,273 A * 2/1993 Inukai ................ B65D 81/3446
219/730

FOREIGN PATENT DOCUMENTS

| | | | | |
|---|---|---|---|---|
| JP | 2005075697 A | * | 3/2005 | |
| JP | 2010086757 A | * | 4/2010 | |
| JP | 2011037654 A | * | 2/2011 | |
| KR | 20000059947 A | * | 10/2000 | |
| WO | WO-2011094460 A2 | * | 8/2011 | .......... H05B 6/6408 |

OTHER PUBLICATIONS

O'Bannon, Dictionary of Ceramic Science and Engineering, pp. 21, 198. (Year: 1984).*

* cited by examiner

*Primary Examiner* — David Sample
(74) *Attorney, Agent, or Firm* — Douglas E. Warren

(57) ABSTRACT

A microwavable thermodynamic element that can be used to reduce the cooling rate of an object that has been previously heated to a temperature greater than the ambient temperature of the object or for use in the reduction of the cooling rate of a heated liquid by immersion of the thermodynamic element into the liquid.

5 Claims, 1 Drawing Sheet

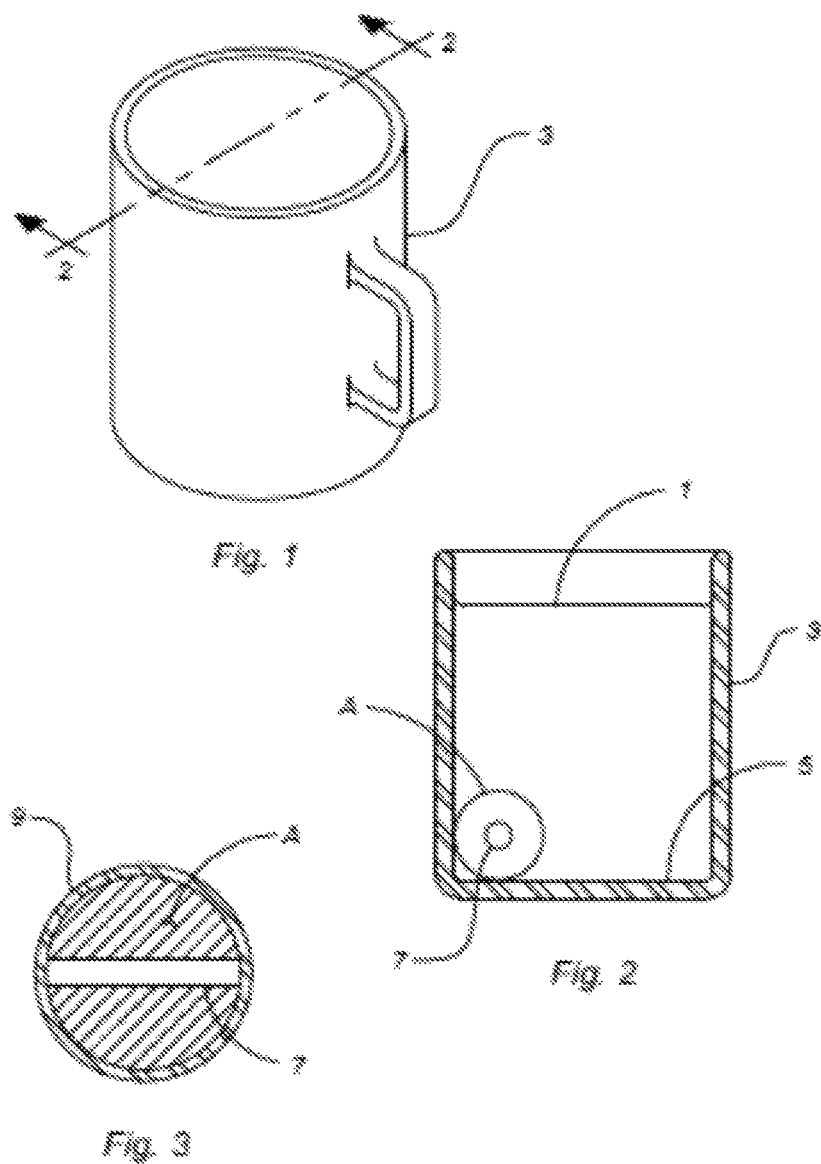

THERMODYNAMIC ELEMENT FOR REDUCING COOLING RATE OF A LIQUID

CROSS REFERENCE TO RELATED APPLICATIONS

Not applicable.

STATEMENT REGARDING FEDERALLY SPONSORED RESEARCH

Not Applicable.

BACKGROUND OF THE INVENTION

When the temperature of a liquid must be increased a heating device is applied to the liquid to raise the temperature of the liquid. When the liquid has reached its desired temperature, the heated liquid is removed from the heating device. Generally, there is a range within which the liquid will be appropriate for use. In the case of a liquid that will be drunken by an individual, such as for example, coffee, it is preferred that the liquid fall with a temperature of between about 100 degrees F. and about 180 degrees F. If the temperature of the liquid lowers until it is outside the lower end of that temperature range, it is very likely that the liquid will no longer of a use and must be either reheated or discarded.

If the liquid is to be reheated, the heating device must again be warmed up and the heating device must again be applied to the liquid until the liquid reaches its desired temperature range. Such heating and reheating can be an annoyance and can result in the eventual deterioration of the liquid to a level the liquid no longer has any use. Additionally, the cost and time needed to reheat the liquid can sometimes accumulate to high levels.

It would be desirable to have a method to reduce the cooling rate of a liquid after it has been removed from a heating device.

SUMMARY OF THE INVENTION

This section provides a general summary of the disclosure, and is not a comprehensive disclosure of its full scope or all of its features.

In accordance with the various embodiments of the present invention, this invention relates to a Thermodynamic Element for use in reducing the cooling rate of a liquid, a solid or a semisolid material such as to maintain the material within a desired temperature range.

DESCRIPTION OF THE DRAWINGS

In the accompanying drawings which form part of the specification:

FIG. 1 is a perspective view of one embodiment of the present invention;

FIG. 2 is a vertical section view of one embodiment of the present invention in use to reduce the cooling rate of a liquid residing within a cup; and FIG. 3 is a vertical section view of one embodiment of the present invention in use to reduce the cooling rate of a semisolid material.

Corresponding reference numerals indicate corresponding steps or parts throughout the several figures of the drawings.

While specific embodiments of the present invention are illustrated in the above referenced drawings and in the following description, it is understood that the embodiments shown are merely some examples of various preferred embodiments and are offered for the purpose of illustration only, and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

In the following description, numerous specific details are set forth such as examples of some preferred embodiments, specific components, devices, and methods, in order to provide a thorough understanding of embodiments of the present disclosure. It will be apparent to a person of ordinary skill in the art that these specific details need not be exclusively employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill.

At least one preferred embodiment of the present invention is illustrated in the drawings and figures contained within this specification. More specifically, certain preferred embodiments of the present invention are generally disclosed and described in FIGS. 1-3.

Referring now to FIGS. 1-3, one embodiment of the present invention of a Thermodynamic Element is shown. In this embodiment the Thermodynamic Element A is used to reduce the cooling rate of a liquid 1 that is residing within a container 3. In this embodiment the liquid 1 is coffee and the container 3 is a coffee cup.

In FIG. 2, the Thermodynamic Element A is shown resting on the bottom 5 of the container 3 and is surrounded by the liquid 1. It is understood that while FIG. 2 shows only one Thermodynamic Element A resting on the bottom 5 of the container 3, more than one Thermodynamic Element A can be used in other applications for embodiments of the present invention.

In the present embodiment, the Thermodynamic Element A is made in the general shape of a sphere. It will be appreciated by those of skill in the art that other shapes may also be used and still remains within the intended scope of the present invention. For example, the Thermodynamic Element A can also be in the shape of a cube, a cone, a lozenge, a cylinder, or a tetrahedron. In fact, the shape of the Thermodynamic Element A can be of any shape or any combination of shapes and still remain within the scope of the present invention. In this embodiment, the Thermodynamic Element A has a spherical diameter of between about 20 mm and about 50 mm. It is understood that the dimensions of the Thermodynamic Element A can be adjusted as needed for any specific application and also still remain within the intended scope of the present invention.

As shown in FIG. 2 and FIG. 3, the Thermodynamic Element A has a circulation opening 7 that passes through the entire spherical shape of the Thermodynamic Element A. The circulation opening 7 in this particular embodiment allows the liquid 1 to flow through the Thermodynamic Element A as it resides on the bottom 5 of the container 3. The liquid 1 will tend to move within the container 3 as the temperature of various regions of the liquid change in temperature and the circulation opening 7 acts to increase the surface area of the Thermodynamic Element A and thus enhance the reduction of the cooling rate of the liquid. It has also been found that the cylindrically shaped opening 7 can also be used as an aid during the manufacturing process to allow for easier the handling of the Thermodynamic Element A.

The present embodiment includes a single cylindrically shaped circulation opening 7 having a diameter of between about 1 mm and about 10 mm. In other embodiments, the circulation opening 7 may be of other sizes and shapes. For example, the cylindrically opening may be in the shape of a square, an ellipse, a star or any other shape that will decrease the cooling rate of the liquid 1 into which the Thermodynamic Element A is being immersed. Additionally, while the present embodiment has a single circulation opening of a certain size, in yet other embodiments there can be more than a single circulation opening of various other sizes and configurations as needed for a specific application of embodiments of the present invention.

In this embodiment the Thermodynamic Element A are made by mixing various components, shaping the mixed components into the shape, configuration, and size as needed for specific application, and then heating that shape at a temperature that will cause the mixture to a solid mass. More specifically the mixture for the Thermodynamic Element A of this embodiment includes mixing a common dry, powdered potter's clay with powdered silicon carbide until the content of the mixture has between about 5% and about 40% percentage of composition. Water is then added to that mixture until the mixture achieves the general consistency of a workable clay, the mixture is shaped into a sphere having a diameter of between about 38 mm and about 40 mm. The shaped mixture is then allowed to dry for a period until the spheres have reached a surface consistency similar to a leather feel. In one embodiment the drying period was about 2 days, however, it is understood that the drying time will depend to some extent on the ambient temperature and humidity where the spherically shaped mixture is being allowed to dry. When the drying is complete, the spherically shaped mixture is fired in a pottery oven to a temperature of about 2,000 degrees F. In one embodiment, one or more circulation openings 7 are placed in the shaped mixture before the spherically shape mixture is allowed to dry. After the spherically shaped mixture has been fired in the pottery oven, the mixture has been converted into one example of the Thermodynamic Element A of the present invention.

In use, one or more of the Thermodynamic Element A are placed within a heating device such as a microwave oven. In one embodiment, the microwave oven as rated at 1200 watts and the Thermodynamic Element A was heated at full power for about 60 seconds where the surface temperature of the Thermodynamic Element A was about 240 degrees F. It will be appreciated that varying the content of the silicon carbide within the mixture for the Thermodynamic Element A can change the surface temperature of the Thermodynamic Element A after heating it as described herein. More specifically, lowering the percentage of composition of the silicon carbide tends to decrease the surface temperature after the heating process has been completed.

Upon completion of heating of the Thermodynamic Element A, it is placed in a heated liquid until the Thermodynamic Element A is fully immersed within the liquid where the Thermodynamic Element A will tend to significantly reduce the cooling rate of the heated liquid.

It is noted that the Thermodynamic Element A can be used in other applications where there is a need to reduce the cooling rate of an item. For example, the Thermodynamic Element A can be shaped into other useful devices such as a bread-rising tray, a baking dish, or any other device where the cooling rate of a substance needs to be reduced. It will be appreciated that embodiments of the present invention can also be used in any circumstance where any type of uniquely shaped microwavable Thermodynamic Element A can be used to reduce the cooling rate of any object.

Additionally, yet other embodiments can be produced with a glaze coating 9 (FIG. 3) applied to the exterior surfaces of the Thermodynamic Element A. In this embodiment, the glaze will be composed of silica, alumina, and a flux composed of a metal oxide. The glaze 9 may also contain a colorants containing metals and metal oxides that can result in a Thermodynamic Element A having a more pleasing aesthetic appearance. The application of the glaze 9 can be done in aqueous solution by dipping the spherical shaped mixture of the Thermodynamic Element A in or powdered form by dusting with a thin coat before heating the spherically shaped mixture in the patter oven as noted above.

In the preceding description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill. The scope of the invention should be determined by any appended claims and their legal equivalents, rather than by the examples given.

Additionally, it will be seen in the above disclosure that several of the intended purposes of the invention are achieved, and other advantageous and useful results are attained. As various changes could be made in the above constructions without departing from the scope of the invention, it is intended that all matter contained in the above descriptions or shown in the accompanying drawings shall be interpreted as illustrative and not in a limiting sense.

Terms such as "proximate," "distal," "upper," "lower," "inner," "outer," "inwardly," "outwardly," "exterior," "interior," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will also be understood that when an element is referred to as being "operatively connected," "connected," "coupled," "engaged," or "engageable" to and/or with another element, it can be directly connected, coupled, engaged, engageable to and/or with the other element or intervening elements may be present. In contrast, when an element is referred to as being "directly connected," "directly coupled," "directly engaged," or "directly engageable" to another element, there are no intervening elements present. Other words used to describe the relationship between elements should be interpreted in a like fashion (e.g., "between" versus "directly between," "adjacent" versus "directly adjacent," etc.).

What is claimed is:

1. A thermodynamic element for reducing the cooling rate of an object comprising:
a microwavable ceramic having a shape and a mixture with material composition of a dry, powdered potter's clay and a powdered silicon carbide at between about 5% and about 40% percentage by weight of the composition and water as needed to achieve general consistency of a workable clay, wherein the microwavable ceramic is allowed to dry, wherein the microwavable ceramic is fired in a pottery oven until the microwavable ceramic reaches a temperature of about 2,000 degrees Fahrenheit, wherein the shape has one of either one circulation opening, or a plurality of circulation openings, and wherein the shape is one of a sphere, a cube, a cone, a lozenge, a cylinder, a tray, or any regular geometric shape.

2. The thermodynamic element of claim 1 wherein the circulation openings have a form of one of either a square, a triangle, an ellipse, a star, or regular geometric shape.

3. A thermodynamic element for reducing the cooling rate of an object comprising:
a microwavable ceramic having a shape and a mixture with material composition of a dry, powdered potter's clay and a powdered silicon carbide at between about 5% and about 40% percentage of composition by weight and water as needed to achieve general consistency of a workable clay, wherein the microwavable ceramic is allowed to dry and wherein the microwavable ceramic is fired in a pottery oven until the microwavable ceramic reaches a temperature of about 2,000 degrees Fahrenheit;
wherein the shape has one of either one circulation opening or a plurality of cylindrically circulation openings; and
wherein the shape is a sphere having a diameter of between about 38 mm and about 40 mm.

4. The thermodynamic element of claim 3 further including a glaze coating on an exterior surface of the thermodynamic element wherein the glaze coating is essentially composed of a silica, an alumina, and a flux composed of a metal oxide.

5. The thermodynamic element of claim 4 further including a colorant added to the glaze coating wherein the colorant includes at least one of either a metal or a metal oxide wherein is applied by one of either an aqueous solution or a powdered form of colorant.

* * * * *